(12) United States Patent
Brier

(10) Patent No.: US 12,340,008 B2
(45) Date of Patent: Jun. 24, 2025

(54) PROTECTIVE APPARATUS PRESENCE DETECTOR

(71) Applicant: Jared Brier, Mill Valley, CA (US)

(72) Inventor: Jared Brier, Mill Valley, CA (US)

(73) Assignee: AKKO GROUP INC., Mill Valley, CA (US)

( * ) Notice: Subject to any disclaimer, the term of this patent is extended or adjusted under 35 U.S.C. 154(b) by 544 days.

(21) Appl. No.: 17/555,123

(22) Filed: Dec. 17, 2021

(65) Prior Publication Data

US 2023/0195948 A1   Jun. 22, 2023

(51) Int. Cl.
*G06F 21/88* (2013.01)
*G06Q 40/08* (2012.01)

(52) U.S. Cl.
CPC .............. *G06F 21/88* (2013.01); *G06Q 40/08* (2013.01)

(58) Field of Classification Search
CPC .......... G06F 21/60; G06F 21/70; G06F 21/86; G06F 21/88; G06F 2200/1633
See application file for complete search history.

(56) References Cited

U.S. PATENT DOCUMENTS

| | | | |
|---|---|---|---|
| 8,813,528 B2 * | 8/2014 | Olear | E05B 73/0082 70/30 |
| 9,264,090 B2 * | 2/2016 | Johnson | H04M 1/0206 |
| 9,362,972 B2 * | 6/2016 | Johnson | H04M 1/185 |
| 9,715,257 B2 * | 7/2017 | Manullang | G06F 1/1626 |
| 10,306,030 B1 * | 5/2019 | Zeng | G06F 1/1656 |
| 10,397,382 B2 * | 8/2019 | Zeng | H04M 1/0202 |
| 10,621,844 B2 * | 4/2020 | Lerner | G08B 13/2462 |
| 11,348,362 B2 * | 5/2022 | Fukunaga | C09J 7/255 |
| 11,685,106 B2 * | 6/2023 | Vinson | B29C 63/0004 156/391 |
| 2016/0077621 A1 | 3/2016 | Min et al. | |
| 2017/0031398 A1 | 2/2017 | Myers et al. | |
| 2017/0115819 A1 | 4/2017 | Thorstenson et al. | |
| 2018/0167098 A1 * | 6/2018 | Armstrong | H04M 1/0202 |
| 2019/0199388 A1 | 6/2019 | Cunningham | |
| 2021/0217093 A1 * | 7/2021 | Fani | G06Q 10/0635 |

FOREIGN PATENT DOCUMENTS

| | | |
|---|---|---|
| EP | 3877728 | 9/2021 |
| WO | WO 2020093166 | 5/2020 |
| WO | WO 2021072557 | 4/2021 |
| WO | WO 2021077219 | 4/2021 |

OTHER PUBLICATIONS

International Search Report and Written Opinion in International Appln. No. PCT/US2022/053254, mailed on Mar. 10, 2023, 15 pages.
International Search Report and Written Opinion mailed Mar. 10, 2023, for International Application No. PCT/US2022/053254 filed Dec. 16, 2022. (15 pages).

* cited by examiner

*Primary Examiner* — Hosuk Song
(74) *Attorney, Agent, or Firm* — Goodwin Procter LLP

(57) ABSTRACT

In an embodiment, a method comprises: detecting, with at least one processor of a device, a presence of a protective apparatus associated with an item; generating, with the at least one processor, a log including data indicating the detected presence; and storing or transferring, with the at least one processor, the log to a server computer or other device.

21 Claims, 6 Drawing Sheets

PROTECTIVE APPARATUS PRESENCE DETECTOR

TECHNICAL FIELD

This disclosure relates generally to protecting items of value, such as electronic devices (e.g., smart phones, smartwatches, tablet computers, laptop computers), or other items, from physical damage or theft (e.g., firearms, jewelry, vehicle bumper guards).

BACKGROUND

Electronic devices, such as smartphones, smartwatches, tablet computers and notebook computers, are susceptible to damage when dropped by a user or being stolen. Due to the high purchase price and cost of repair, some insurance carriers offer insurance to consumers to replace or repair their damaged devices. Like automobile and hazard insurance, these insurance companies desire to set premiums and/or deductibles based on whether the user has engaged protective measures to mitigate damage to or theft of the device, such as a protective case or screen protector or an anti-theft device (e.g., a cable lock). Currently, however, there is no technology available that allows insurance carriers to determine if such damage protective devices or anti-theft devices were used at the time the damage or theft occurred.

SUMMARY

Disclosed is a system for and method of detecting the presence of a protective apparatus attached to or enclosing an item.

In an embodiment, a method comprises: detecting a presence of a protective apparatus associated with an item; generating a log including data indicating the detected presence; and storing or transferring the log to a network-based computer or other device.

In an embodiment, the protective apparatus is a protective case attached to or surrounding the item.

In an embodiment, the protective apparatus is a screen protector attached to a overlaying a display screen of an electronic device.

In an embodiment, the protective apparatus is an anti-theft device coupled to or enclosing the item.

In an embodiment, the item is a smartphone.

In an embodiment, detecting, with at least one processor of a device, a presence associated with the item, comprises: receiving, from the protective apparatus over a short-range communication channel, a signal or data indicating the presence of the protective apparatus.

In an embodiment, detecting, with at least one processor of a device, a presence of a protective apparatus associated with the item, comprises: sensing, with a proximity sensor of the item, the presence of the protective apparatus.

In an embodiment, the proximity sensor is a capacitive sensor or an inductive sensor.

In an embodiment, the method further comprises: determining, with a location processor of a device or item, a location of the item; and generating, with the at least one processor, a log including data indicating the detected presence of the protective apparatus and the location of the item.

In an embodiment, the method further comprises: determining, with at least one inertial sensor of a device or item, motion of the item; and generating, with the at least one processor, the log including data indicating the detected presence of the protective apparatus and the motion of the item.

In an embodiment, a system comprises: at least one processor; and memory storing instructions that when executed by the at least one processor, cause the at least one processor to perform an of the preceding methods.

Particular embodiments disclosed herein provide one or more of the following advantages. A device can detect when a protective cover, screen protector or anti-theft device is present using short-range communication technology. In an embodiment, a total time and/or specific trigger events that a protective apparatus is used to protect an item is logged and sent to a network-based server computer or other device for storage or transfer to another device for further analysis. The log can be used by, for example, an insurance carrier to determine if an item was attached to or enclosed by a protective apparatus or anti-theft device when the item was damaged or stolen. This allows insurance carriers or third parties (e.g., warranty providers, service contract providers or any other entity with a financial interest in the loss/damage to a device) to issue an protective apparatus, such as protective cases, screen protectors and anti-theft devices to their customers, and use the logs to calculate customized insurance premiums and/or deductibles and/or discounts based on whether and when the protective apparatus was used.

In an embodiment, inertial sensors and/or a location processor on the insured item and/or protective apparatus provides additional information that can also be logged by the insured item and/or protective apparatus and used to determine insurance premiums, deductibles and/or discounts. In another embodiment, the disclosed system and method determines whether an anti-theft device (e.g., a cable lock) was connected to the item (e.g., connected to a laptop computer) at the time the theft occurred.

The foregoing is advantageous to both insurers, third parties (e.g., warranty providers, service contract providers or any other entity with a financial interest in the loss/damage to a device) and customers in that customers who are proactive in preventing damage or theft are rewarded through reduced premiums, deductibles or discounts, and the insurance carriers receive less claims or less costly claims.

The details of the disclosed embodiments are set forth in the accompanying drawings and the description below. Other features, objects and advantages are apparent from the description, drawings and claims.

DESCRIPTION OF DRAWINGS

The same reference symbol used in various drawings indicates like elements.

INTERPRETATION OF TERMS/FIGURES

Figure 1:
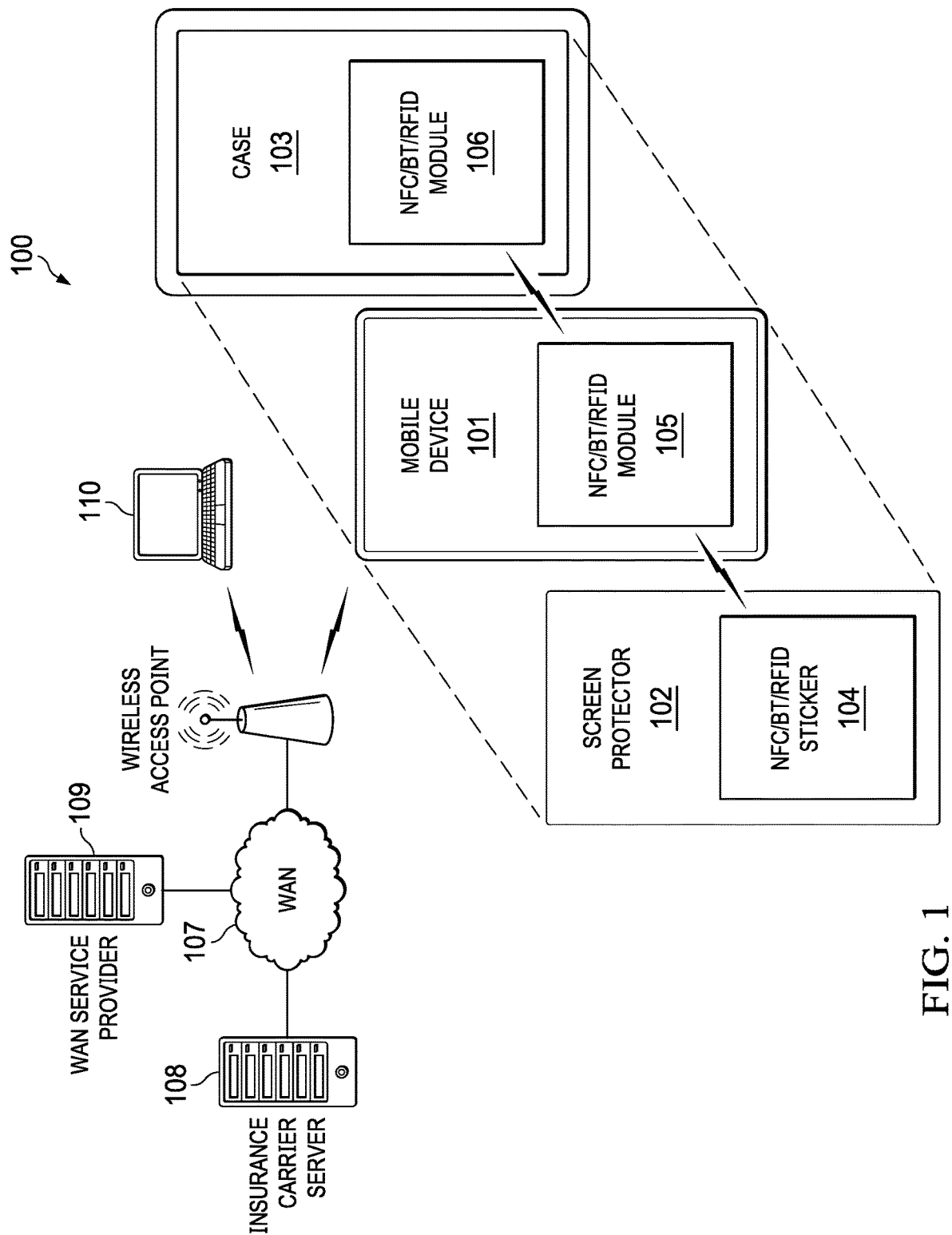
FIG. 1 illustrates a system of detecting presence of a protective apparatus, according to an embodiment.

In the following detailed description, for the purposes of explanation, numerous specific details are set forth in order to provide a thorough understanding of the disclosed embodiments. It will be apparent, however, that the disclosed embodiments may be practiced without these specific details. In other instances, well-known structures and devices are shown in block diagram form in order to avoid unnecessarily obscuring the present invention.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description.

As used herein the term "one or more" or "at least one" includes a function being performed by one element, a function being performed by more than one element, e.g., in a distributed fashion, several functions being performed by one element, several functions being performed by several elements, or any combination of the above. It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting.

As used in the description of the various disclosed embodiments and the appended claims, the singular forms "a," "an" and "the" [good case law that supports this as well] are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "includes," and/or "including," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Reference will now be made in detail to the disclosed embodiments, examples of which are illustrated in the accompanying drawings. In the following detailed description, numerous specific details are set forth to provide a thorough understanding of the various described embodiments. However, it will be apparent to one of ordinary skill in the art that the various disclosed embodiments may be practiced without these specific details. In other instances, well-known methods, procedures, components, circuits, and networks have not been described in detail so as not to unnecessarily obscure aspects of the disclosed embodiments.

DETAILED DESCRIPTION

The disclosed embodiments include a system, method and non-transitory, computer-readable storage medium for detecting the presence of a physical apparatus that provides an item from physical damage and/or theft (hereinafter, each referred to as a "protective apparatus"). The protective apparatus can be any physical structure that is associated with one or more items, including but not limited to a protective apparatus that is: attached, coupled, fixed, wrapped around, adhered to, or that fully or partially encloses the one or more items to protect the one or more items from physical damage or theft. An item can be any item, including but not limited to: electronic devices (e.g., a smartphone, smartwatch, tablet computer, laptop computer), and non-electronic devices (e.g., firearms, jewelry, vehicle bumper guards. The presence of a protective apparatus can be detected using a variety of communication technologies, including but not limited to: NFC, Bluetooth or radio frequency identification (RFID) technology. In an embodiment, capacitive or inductive proximity sensing is used to detect the presence of a protective apparatus. For example, the touch screen of mobile device (e.g., a smartphone, tablet computer) can be used to sense the presence of screen protector that includes a transparent conductive layer that can be capacitively "sensed" by capacitive sensors of the touch screen. In an embodiment, inductive proximity sensing can be used to detect the presence of a protective case or anti-theft device that is made at least partially of metal, such that the sensor detects magnetic loss due to eddy currents that are generated on a conductive surface by an external magnetic field.

After detection, a processor on the item being protected or the protective apparatus starts an internal timer/counter to accumulate a total time that the protective apparatus is protecting the item, and/or generate timestamps for specific detected events, such as a detected impact to the item (e.g., when the item is dropped). The time data and optionally other data is stored in a log on the protective apparatus and/or the item for subsequent transmission to a remote server computer (e.g., a server computer operated by or on behalf of an insurance carrier, warranty provider, service contract provider or any other entity with a financial interest in the loss/damage to a device). In an embodiment, the protective apparatus communicates with an independent transponder/transmitter device that relays to either a smart device or network-based computing platform via, for example, an access point (e.g., WIFI router) connected to the Internet.

The foregoing and other features will now be described in further detail with respect to the figures.

System Overview

FIG. 1 illustrates a system 100 of detecting presence of a protective apparatus, according to an embodiment. Although the description below pertains to a smartphone, system 100 is applicable to any item that can be enclosed in, coupled or attached to, embedded in a protective apparatus. Also, the protective apparatus is not limited to a protective case or screen protector, but also includes any physical structure capable of protecting any item from damage caused by impact or other forces or energy, such as exposure to radiation, fire, water, explosions, contaminants, viruses, etc. For example, system 100 can be applied to shipping containers containing items of value that are typically insured.

System 100 includes electronic device 101, screen protector 102, protective case 103, communication modules 104-106, wide area network (WAN) 107 (e.g., Internet), server computer 108, WAN service provider server 109 and laptop computer 110.

Screen protector 102 can be, for example, a transparent plastic film or tempered glass that is placed over a display screen of mobile device 101. Protection case 103 can be, for example, a rubber/vinyl sleeve (impact bumper) that electronic device 101 is slipped into or a hard shell case or a plastic bumper that wraps around the perimeter of mobile device 101, such as the protective apparatus described in reference to FIGS. 2A-2C.

Figure 3A:
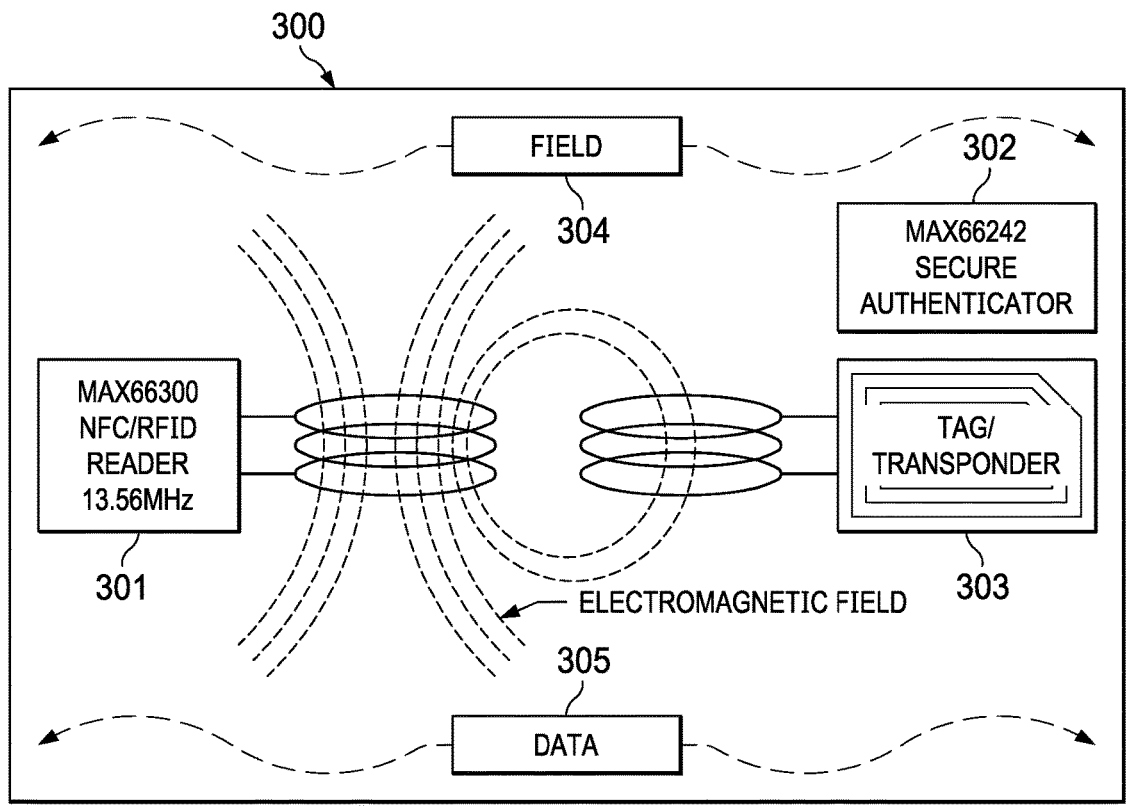
FIG. 3A illustrates near field communication (NFC) between an electronic device and a protective apparatus, according to an embodiment.
Figure 3B:
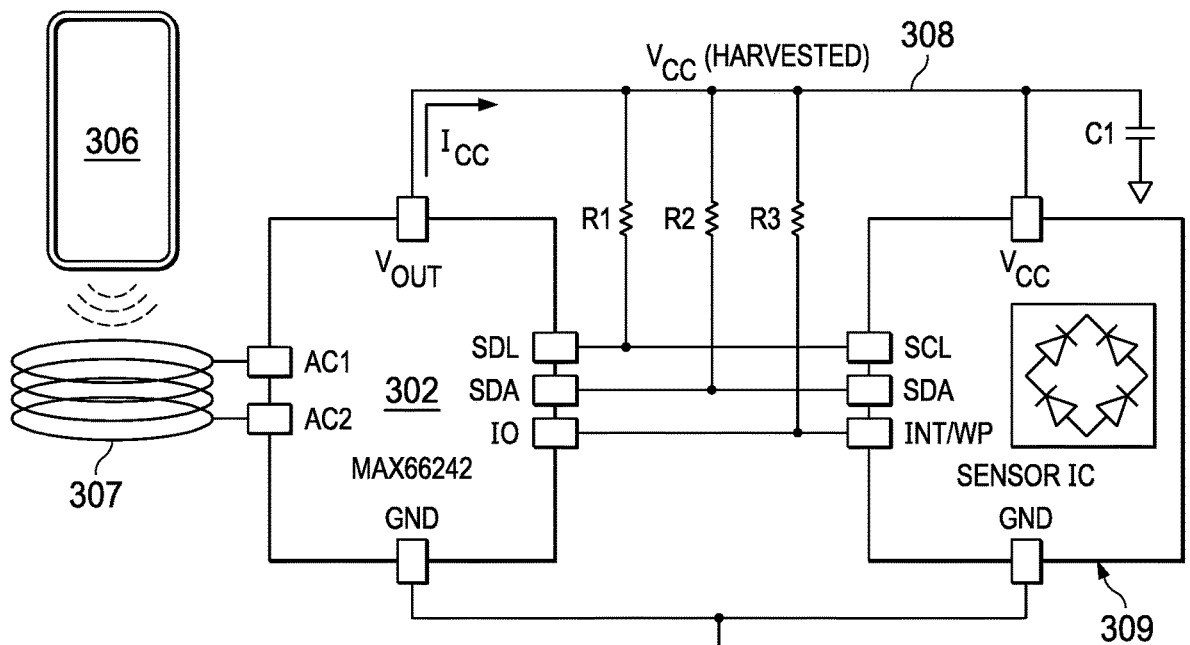
FIG. 3B is a circuit schematic of an NFC system for communicating between a protective apparatus and an electronic device, according to an embodiment.

Communication modules 104-106 can be RF transceiver chips (e.g., transponders), such as is described in reference to FIGS. 3A and 3B. Communications modules 104-106 include the hardware and software needed to establish short-range communication, including but not limited to NFC, Bluetooth™ (BT), RFID protocol stacks and magnetic sensors.

When screen protector 102 is attached to electronic device 101, communication module 105 (e.g., an NFC reader) embedded in electronic device 101 detects and connects/pairs with communication module 104 (e.g., an NFC tag/transponder) using a suitable communication protocol. After communication is established, a processor in mobile device 101 (or attached or embedded in screen protector 102) creates a log file and stores a timestamp and data indicating the communication, such as a timestamp and information uniquely identifying screen protector 102 and mobile device 101 (e.g., serial numbers, model numbers, etc.).

In the case of NFC communication, once the communication module 104 (NFC tag/transponder) attached to screen protector 102 has been detected by the communication module 105 (NFC reader), communication module 105 will continuously power the communication module 104 (e.g., the high frequency (HF) carrier is kept on) and exchange commands with communication module 104. The commands that are exchanged during this "keep-alive" phase or "presence check" can depend on the NFC tag/transponder type, the operation system and the NFC stack implementation, and includes but is not limited to: repeated deactivation and re-activation cycles, repeatedly reading a certain memory area, or some other bi-directional command sequence that allows the NFC stack to find out if the NFC tag/transponder is still responsive.

In an embodiment, if the presence check fails, communication module 105 will switch off the HF carrier and re-start a polling sequence (e.g., testing for supported tag/transponder technologies) or start a sensing phase, where a short HF carrier pulses to detect detuning that indicates the potential presence of an NFC tag/transponder. In an embodiment, if the "presence" check fails after a specified number of attempts, communication module 105 (NFC reader) assumes that screen protector 102 is no longer attached to electronic device 101, which is recorded in a log.

In an embodiment, capacitive or inductive proximity sensing is used to detect the presence of screen protector 102. For example, the display (e.g., a touch screen) of electronic device 101 can be used to sense the presence of screen protector 102 that includes a transparent conductive layer that can be capacitively "sensed" by capacitive sensors of the touch screen.

Similar to screen protector 102, protective case 103 includes embedded communication module 106. In the case of NFC communication, once the communication module 106 (NFC tag/transponder) attached to protective case 103 has been detected by the communication module 105 (NFC reader), communication module 105 will continuously power the communication module 106 (e.g., the high frequency (HF) carrier is kept on) and exchange some commands with communication module 106. NFC communication between communication modules 106 and 105 will be performed in a similar manner to NFC communication between communication modules 104 and 105, as described above.

In an embodiment, inductive proximity sensing can be used to detect the presence of protective case 103 or an anti-theft device that is made at least partially of metal, such that the sensor detects magnetic loss due to eddy currents that are generated on a conductive surface by an external magnetic field.

Figure 2A:
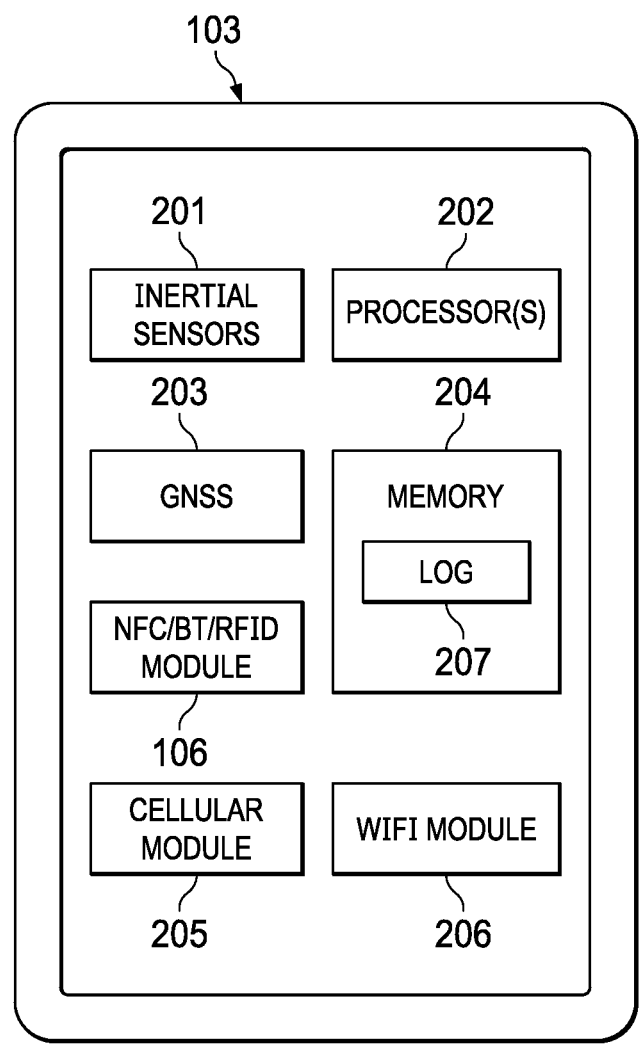
FIG. 2A illustrates various components of the example protective apparatus shown in in FIG. 1, according to an embodiment.

FIG. 2A illustrates various components of the example protective case 103 shown in in FIG. 1. In an embodiment, protective case 103 includes inertial sensors, processor(s) 202, location processor 203 (e.g., a global navigation satellite system (GNSS) receiver chip), memory 204, communication module 106, cellular module 205 and WIFI module 206. Memory stores log 207 as well as instructions executed by processor(s) to perform various functions disclosed herein.

In an embodiment, a total time and/or specific trigger events that a protective case 103, screen protector 102 or an anti-theft device is used is logged by electronic device 101 and sent to, for example, insurance carrier server 108 for storage and further analysis by a claim adjuster.

In an embodiment, a total time and/or specific trigger events that protective case 103, screen protector 102 or an anti-theft device is used is logged in log 207 by electronic device 101 and sent to, for example, insurance carrier server 108 for storage and further analysis by a claim adjuster. The information in log 207 can be used by, for example, an insurance carrier to determine if electronic device 101 had a protective case 103, screen protector 102 or anti-theft device when the electronic device 101 was damaged or stolen. This allows insurance carriers or third parties to issue protective cases, screen protectors and/or anti-theft devices to their customers and then use the logs retrieved from the insured mobile devices to calculate customized insurance premiums and/or deductibles and/or discounts based on whether the user has utilized the protective cover/screen protector or anti-theft device.

In an embodiment, log 207 is received by WAN server 109 (e.g., operated by a wireless service or Internet service provider (ISP)), which then sends or provides access to the log data to, for example, an insurance carrier server 108 or third party (e.g., warranty provider, service contract provider or any other entity with a financial interest in the loss/damage to a device) over the Internet and/or other network.

In an embodiment, inertial sensors 201 and a location processor 203 on the insured electronic device 101 provides additional information that can also be logged by electronic device 101 and used to determine insurance premiums, deductibles and/or discounts. In another embodiment, the disclosed system and method determines whether an anti-theft device (e.g., a cable lock) was connected to electronic device 101 (e.g., connected to a laptop computer) at the time the theft occurred.

Figure 2B:
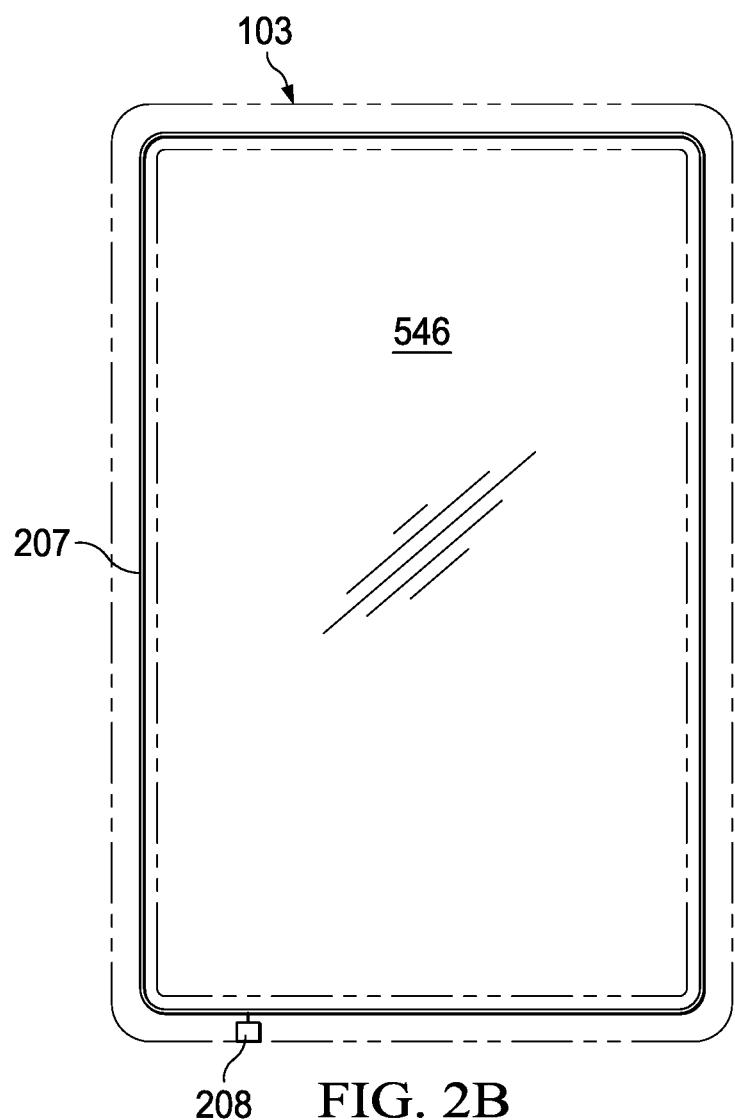
FIG. 2B is a top plan view of a protective apparatus with an antenna and transponder, according to an embodiment.

FIG. 2B is a top plan view of an example protective apparatus 103 with an antenna and transponder, according to an embodiment. In this example, protective apparatus 103 is an impact bumper for a smartphone. An example impact bumper, is the Fusion™ bumper, manufactured by Mobile Outfitters Inc. of Philadelphia, Pa, USA.

Protective apparatus 103 surrounds the perimeter of the smartphone to protect the smartphone from damage due to impact with the ground or object. The protective apparatus extends (e.g., a few mm) above touch surface 546, so that if the smartphone experiences a face-down fall the extended portion of protective wrap 103 will cushion the impact. In an embodiment, the extended portion can include an embedded loop antenna 207 coupled to transponder 208, which can also be embedded in or attached to protective apparatus 103.

Figure 2C:
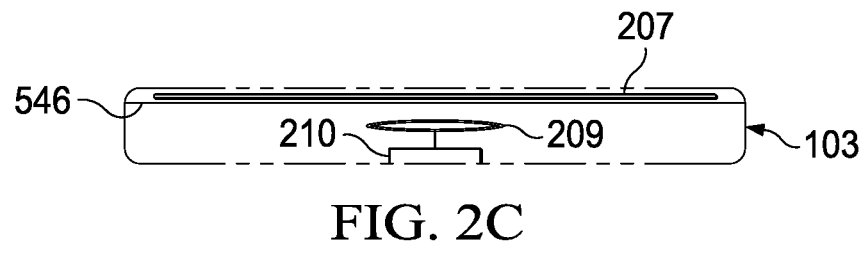
FIG. 2C is a side view of the protective apparatus with the antenna and transponder shown in FIG. 2B, according to an embodiment.

FIG. 2C is a side view of protective apparatus 103 with antenna 207 and transponder 208 (e.g., MAX66242 transponder), according to an embodiment. Also shown is reader antenna 209 and reader chip 210 (e.g., MAX66300 NFC/RFID reader chip). In the orientation shown, reader antenna 209 is parallel to loop antenna 208, and thus the ability of transponder 207 to harvest power from the electromagnetic waves emitted by reader antenna 209 is improved.

Note that the antenna and transponder configuration shown in FIGS. 2A-2C is only one example configuration. Other configurations are also possible and may depend on the orientation of the reader antennas. Since reader antennas in popular devices, such as smartphones are fixed at a particular location, different tag/transponder antenna orientations can be designed into the protective apparatus for a specific make, model or design of the item being protected.

FIG. 3A illustrates an example system 300 for communicating the presence of a protective apparatus, such as a protective case, screen protector or anti-theft device, according to an embodiment. System 300 includes NFC/RFID reader chip 301 for exchanging data 305 with an NFC/RFID transponder chip 302 through electromagnetic field 304. Transponder chip 302 is embedded in tag 303, which can be, for example, a sticker that is placed on the screen protector 104 and/or protective case 103.

FIG. 3B is a circuit schematic of NFC/RFID transponder chip 302 shown in FIG. 3A, for communicating between the protective apparatus (screen protector, protective case) and electronic device 306 (e.g., a smartphone), according to an embodiment. In an embodiment, NFC/RID transponder chip 302 is a MAX66242 chip manufactured by Maxim Integrated Inc. of San Jose, California In an embodiment, transponder chip 302 is coupled to antenna 307 (e.g., a coil coupled to an LC-tank circuit) and can detect electromagnetic (EM) fields emitted from an NFC/RFID antenna built-in to electronic device 306. Electronic device 306 can have an embedded NFC reader chip (e.g., NFC/RFID reader 520 in FIG. 5) coupled to the built-in antenna, such as the MAX66300 IC also manufactured by Maxim Integrated, Inc. The MAX66242 can be configured to harvest energy from the electromagnetic field using harvesting circuit 308 (e.g., a voltage divider network).

In an embodiment, a sensor integrated circuit (IC) chip 309, such as a shock/vibration sensor, can be connected to the MAX66242 IC 302 as shown. Thus, if electronic device 306 is dropped while the protective apparatus is attached, then shock/vibration sensor 309 will detect the impact, and send detection data to electronic device 306 via antenna 307 in response to the impact. Electronic device 306 will log the detection data with a timestamp and the location of electronic device 306 provided by a Global Positioning System (GPS) receiver (e.g., location processor 515).

In an embodiment, motion sensors in electronic device 306 (e.g., accelerometers, gyros) will generate motion data (e.g., accelerations, rotation rates) that are indictive of the state or trajectory of electronic device 396 prior to the time of impact. For example, an acceleration signature or pattern, such as a large forward acceleration over a long distance (e.g., 6 feet), may indicate that electronic device 306 was thrown rather than dropped. Similarly, a large vertical acceleration followed immediately by a sudden deceleration would indicate a dropped mobile device 306. If no log data is captured at or around the time of the incident, the absence of any log data may indicate that the protective apparatus was not attached to mobile device 306 at the time of impact.

In an embodiment, altimeter data from an altimeter sensor (e.g., barometer 517 in FIG. 5) embedded in electronic device 306 can provide altitude/height data that could also be used alone or together with motion data to determine the state or trajectory of electronic device 306 just prior to the impact detection.

After the impact is detected and the log file is created, electronic device 306, the protective apparatus and/or an independent transponder relay device can then send the log file to a server computer through a WIFI or cell tower access point and then through the Internet to a server computer operated by and ISP or an insurance carrier, as shown in FIG. 1. An insurance adjuster can then analyze the data when processing a claim.

Example Process

Figure 4:
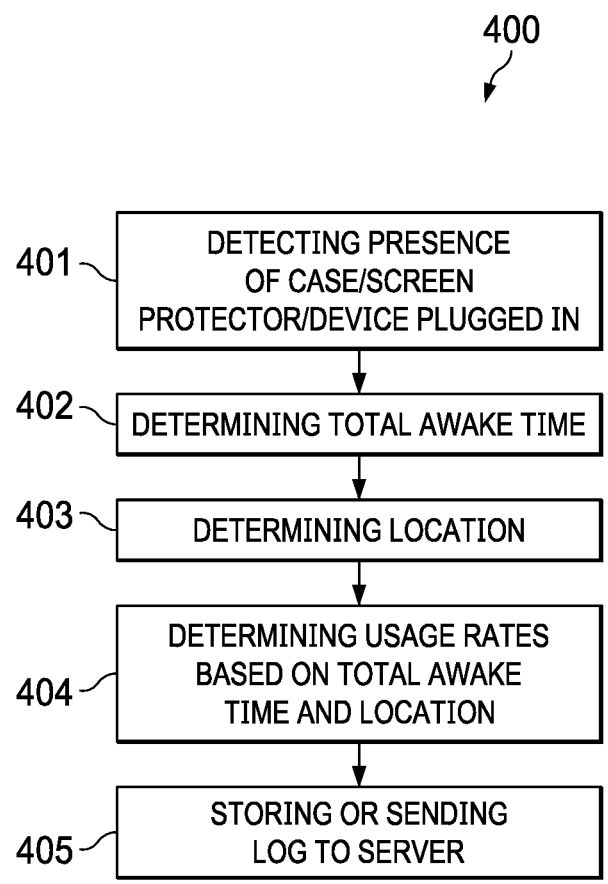
FIG. 4 is a flow diagram of a process of detecting presence of a protective apparatus connected to or enclosing an electronic device, according to an embodiment.

FIG. 4 is a flow diagram of a process 400 of detecting presence of a protective apparatus, such as a protective cover, screen protector, enclosure or ant-theft device installed on, enclosing or connected to an item, according to an embodiment. Process 400 can be implemented using, for example, the electronic device architecture shown in FIG. 5.

Process 400 performs the steps of detecting the presence of the protective apparatus associated with an item (401), determining a total wake time for the item (402), determining a location of the item (403), determining usage rates based on the total awake time and location (404), storing or sending log data indicating detected presence, total awake time and item location to a server computer (e.g., a server operated by an insurance carrier, warranty provider, service contract provider or any other entity with a financial interest in the loss/damage to a device) for further analysis (405). Each of these steps was previously described in reference to FIGS. 1-3.

Figure 5:
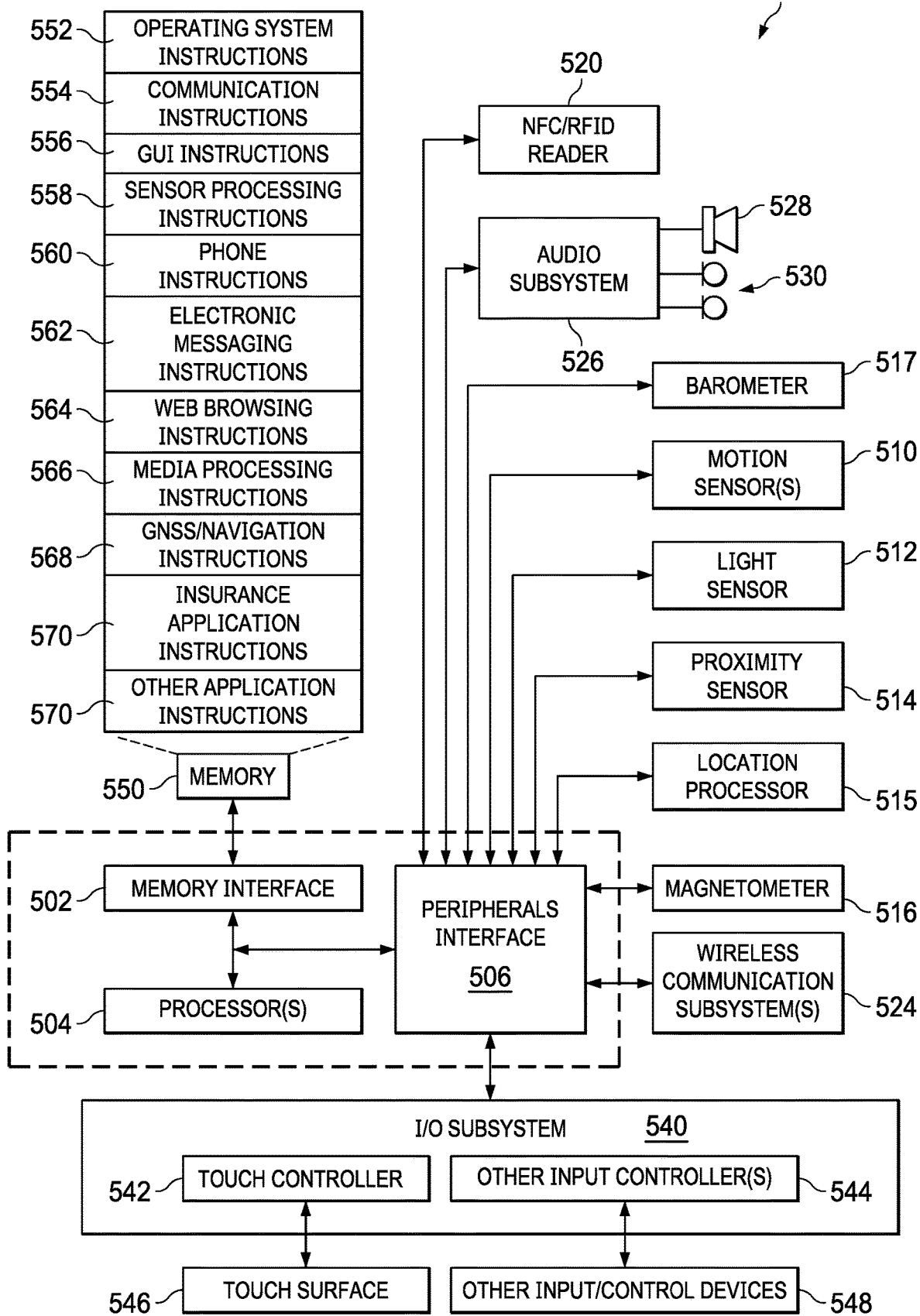
FIG. 5 is an example electronic device architecture for implementing at least some of the features and/or processes described in reference to FIGS. 1-5, according to an embodiment.

FIG. 5 is an example electronic device architecture for implementing at least some of the features and/or processes described in reference to FIGS. 1-4, according to an embodiment. Architecture 500 can embedded in a smartphone, tablet computer, laptop computer, a secured container or other enclosure, etc. Architecture 500 can include memory interface 502, one or more data processors, digital signal processors (DSPs), image processors and/or central processing units (CPUs) 504 and peripherals interface 506. Memory interface 502, one or more processors 504 and/or peripherals interface 506 can be separate components or can be integrated in one or more integrated circuits.

Sensors, devices and subsystems can be coupled to peripherals interface 506 to provide multiple functionalities. For example, one or more motion sensors 510, light sensor 512 and proximity sensor 514 can be coupled to peripherals interface 506 to facilitate motion sensing (e.g., acceleration, rotation rates), lighting and proximity functions of the wearable computer.

Location processor 515 can be connected to peripherals interface 506 to provide geo-positioning. In some implementations, location processor 515 can be a global navigation satellite system (GNSS) receiver, such as the Global Positioning System (GPS) receiver.

Electronic magnetometer 516 (e.g., an integrated circuit chip) can also be connected to peripherals interface 506 to provide data that can be used to determine the direction of magnetic North. Electronic magnetometer 516 can provide data to an electronic compass application.

Motion sensor(s) 510 can be an IMU that includes one or more accelerometers and/or gyros (e.g., 3-axis MEMS accelerometer and 3-axis MEMS gyro) configured to determine change of speed and direction of movement of the source device. Barometer 517 can be configured to measure atmospheric pressure around the mobile device.

Haptic engine 520 generates haptic output through mechanical coupling with an input structure, such as touch surface 546.

Communication functions can be facilitated through wireless communication subsystems 524, which can include radio frequency (RF) receivers and transmitters (or transceivers) and/or optical (e.g., infrared) receivers and transmitters. The specific design and implementation of the wireless communication subsystem 524 can depend on the communication network(s) over which a mobile device is intended to operate. For example, architecture 500 can include communication subsystems 524 designed to operate over a GSM network, a GPRS network, an EDGE network, a Wi-Fi™ network and a Bluetooth™ network. In particular, the wireless communication subsystems 524 can include hosting protocols, such that the mobile device can be configured as a base station for other wireless devices. In an embodiment, wireless communication subsystem 524 can include an NFC/RFID reader chip, as described in reference to FIG. 3B.

Audio subsystem 526 can be coupled to a speaker 528 and one or more microphones 530 to facilitate voice-enabled functions, such as voice recognition, voice replication, digital recording and telephony functions. Audio subsystem 526 can be configured to receive voice commands from the user.

I/O subsystem 540 can include touch surface controller 542 and/or other input controller(s) 544. Touch surface controller 542 can be coupled to a touch surface 546. Touch surface 546 and touch surface controller 542 can, for example, detect contact and movement or break thereof using any of a plurality of touch sensitivity technologies, including but not limited to capacitive, resistive, infrared and surface acoustic wave technologies, as well as other proximity sensor arrays or other elements for determining one or more points of contact with touch surface 546. Touch surface 546 can include, for example, a touch screen or the digital crown of a smart watch. In an embodiment, touch surface 546 can be a pressure-sensitive surface.

Other input controller(s) 544 can be coupled to other input/control devices 548, such as one or more buttons, rocker switches, thumb-wheel, infrared port and USB port. The one or more buttons (not shown) can include an up/down button for volume control of speaker 283 and/or microphones 530. Touch surface 546 or other input control devices 548 (e.g., a button) can include, or be coupled to, fingerprint identification circuitry for use with a fingerprint authentication application to authenticate a user based on their fingerprint(s).

In one implementation, a pressing of the button for a first duration may disengage a lock of the touch surface 546; and a pressing of the button for a second duration that is longer than the first duration may turn power to the mobile device on or off. The user may be able to customize a functionality of one or more of the buttons. The touch surface 546 can, for example, also be used to implement virtual or soft buttons.

In some implementations, the mobile device can present recorded audio and/or video files, such as MP3, AAC and MPEG files. In some implementations, the mobile device can include the functionality of an MP3 player. Other input/output and control devices can also be used.

Memory interface 502 can be coupled to memory 550. Memory 550 can include high-speed random access memory and/or non-volatile memory, such as one or more magnetic disk storage devices, one or more optical storage devices and/or flash memory (e.g., NAND, NOR). Memory 550 can store operating system 552 instructions, such as the iOS operating system developed by Apple Inc. of Cupertino, California. Operating system 552 may include instructions for handling basic system services and for performing hardware dependent tasks. In some implementations, operating system 552 can include a kernel (e.g., UNIX kernel).

Memory 550 may also store communication instructions 554 to facilitate communicating with one or more additional devices, one or more computers and/or one or more servers, such as, for example, instructions for implementing a software stack for wired or wireless communications with other devices. Memory 550 may include graphical user interface (GUI) instructions 556 to facilitate graphic user interface processing; sensor processing instructions 558 to facilitate sensor-related processing and functions; phone instructions 560 to facilitate phone-related processes and functions; electronic messaging instructions 562 to facilitate electronic-messaging related processes and functions; web browsing instructions 564 to facilitate web browsing-related processes and functions; media processing instructions 566 to facilitate media processing-related processes and functions; GNSS/Location instructions 568 to facilitate generic GNSS and location-related processes; and insurance applications instructions 570 for generating insurance data based on log data. Memory 550 further includes other application instructions 572 for use various applications. Each of the above identified instructions and applications can correspond to a set of instructions for performing one or more functions described above. These instructions need not be implemented as separate software programs, procedures, or modules. Memory 550 can include additional instructions or fewer instructions. Furthermore, various functions of the mobile device may be implemented in hardware and/or in software, including in one or more signal processing and/or application specific integrated circuits.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., SWIFT, Objective-C, C#, Java), including compiled or interpreted languages, and it can be deployed in any form, including as a stand-alone program or as a module, component, subroutine, a browser-based web application, or other unit suitable for use in a computing environment.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

What is claimed is:

1. A method comprising:
   detecting, with at least one processor, a presence of a protective apparatus protecting an item based on electronic communication with a communication module of the protective apparatus;
   determining that the protective apparatus no longer protects the item when the electronic communication with the communication module of the protective apparatus fails after a specified number of attempts;
   generating, with the at least one processor, a log including data of the electronic communication indicating the presence of the protective apparatus; and
   storing or transferring, with the at least one processor, the log to a server computer or other device.

2. The method of claim 1, wherein the protective apparatus is a protective case attached to or partially or fully enclosing the item.

3. The method of claim 1, wherein the protective apparatus is a screen protector attached to and overlaying a display screen of the item.

4. The method of claim 1, wherein the protective apparatus is an anti-theft device coupled or fully or partially enclosing the item.

5. The method of claim 1, wherein the item is an electronic device.

6. The method of claim 1, wherein detecting the presence of the protective apparatus comprises:
   receiving, from the protective apparatus over a short-range communication channel, data indicating the presence of the protective apparatus.

7. The method of claim 1, wherein detecting the presence of the protective apparatus comprises:
   sensing, with a proximity sensor, the presence of the protective apparatus.

8. The method of claim 7, wherein the proximity sensor is a capacitive sensor or an inductive sensor.

9. The method of claim 1, further comprising:
   determining, with a location processor, a location of the item; and
   generating, with the at least one processor, the log including data indicating the detected presence of the protective apparatus and the location of the item.

10. The method of claim 1, further comprising:
    determining, with at least one inertial sensor, motion of the item; and
    generating, with the at least one processor, the log including data indicating the detected presence of the protective apparatus and the motion of the item.

11. A system comprising:
    at least one processor; and
    memory storing instructions that when executed by the at least one processor, cause the at least one processor to perform operations comprising:
      detecting a presence of a protective apparatus associated with an item based on electronic communication with a communication module of the protective apparatus;
      determining that the protective apparatus no longer protects the item when the electronic communication with the communication module of the protective apparatus fails after a specified number of attempts; and generating a log including data of the electronic communication indicating the presence of the protective apparatus.

12. The system of claim 11, wherein the operations further comprise transferring the log to a server computer or other device.

13. The system of claim 12, wherein the protective apparatus is a protective case attached to or fully or partially enclosing the item.

14. The system of claim 12, wherein the protective apparatus is a screen protector attached to and overlaying a display screen of the item.

15. The system of claim 12, wherein the protective apparatus is an anti-theft device coupled to the item.

16. The system of claim 12, wherein the item is an electronic device.

17. The system of claim 12, wherein the protective apparatus is coupled to or fully or partially enclosing the item, wherein detecting the presence of the protective apparatus comprises:

receiving, from the protective apparatus over a short-range communication channel, data indicating the presence of the protective apparatus.

18. The system of claim 12, further comprising a proximity sensor configured to detect the presence of the protective apparatus.

19. The system of claim 18, wherein the proximity sensor is a capacitive sensor or an inductive sensor.

20. The system of claim 12, further comprising:
a location processor configured to determine a location of the device,
wherein the at least one processor enters the location into the log.

21. The system of claim 12, further comprising:
at least one inertial sensor configured to determine motion of the device,
wherein the at least one processor enters data indicating the motion into the log.

* * * * *